United States Patent Office 3,585,220
Patented June 15, 1971

3,585,220
NOVEL ANTHRAQUINONE DISPERSE DYES
Eiji Yamada, Takatsuki-shi, and Takashi Akamatsu, Ashiya-shi, Japan, assignors to Sumitomo Chemical Company, Ltd., Higashi-ku, Osaka, Japan
No Drawing. Filed Mar. 8, 1967, Ser. No. 621,446
Int. Cl. C09b 1/50
U.S. Cl. 260—376      6 Claims

ABSTRACT OF THE DISCLOSURE

The dyes are of the class of anthraquinone disperse dyes areas and employable for dyeing synthetic fiber materials such as polyester in clear violet shade with exceedingly high fastnesses, especially fastness to sublimation at a high temperature.

---

The present invention is concerned with anthraquinone disperse dyes employed for dyeing fabric materials comprising synthetic fibers, particularly polyester, polyamide, polyurethane and acetyl cellulose fibers.

In this field, dyes having high fastnesses, especially fastness to sublimation are more useful for dyeing such fibers, reasons of which are of the requirement in dyeing, especially higher temperature treatments such as the thermosol dyeing, and in finishing a dyed product according to the permanent press method, which has become more suitable for finishing such products.

So far, these kinds of dyes, for example, having the following formula,

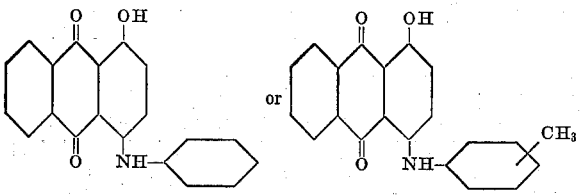

have been known with defects of deteriorated fastness to sublimation.

Accordingly, these known dyes have not advantageously been employed for dyeing abovementioned fibers by means of the said higher temperature treatments, and the products dyed with such dyes have hardly been finished according to the permanent press method.

Thus, one object of the present invention is to provide novel anthraquinone disperse dyes having so higher fastnesses, especially fastness to sublimation that they can be advantageously employed for deying synthetic fibers according to higher temperature treatments.

Another object of the present invention is to provide synthetic fibers dyed with the said dyes, which can be finished according to the permanent press method.

Further objects of the present invention will be apparent from the following descriptions.

The present inventors have made various studies on finding novel dyes which fulfill the requirements mentioned above and found that these and other objects of the present invention can be accomplished by provision of novel anthraquinone disperse dyes having the following formula,

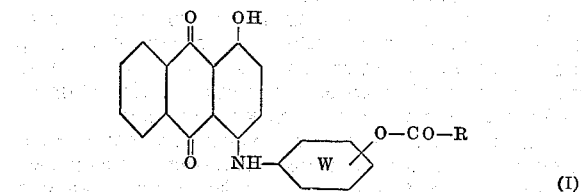

wherein R is a saturated or unsaturated alkyl group having 1 to 6 carbon atoms, a substituted alkyl group (where the substituent is a methoxy, ethoxy, hydroxy, phenoxy or phenyl group or a halogen atom), a phenyl group, a substituted phenyl group (where the substituent is a lower alkyl or alkoxy group having 1 to 2 carbon atoms or a halogen atom) or a cyclohexyl group; and the nucleus W may further be substituted by a methyl group or a halogen atom, and synthetic fiber articles dyed with the said novel anthraquinone disperse dye.

In the present invention, a process for producing the said dyes is also provided, which comprises contacting a hydroxy compound represented by the general formula,

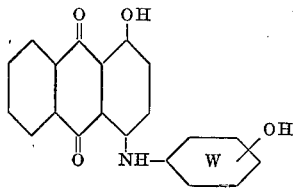

wherein W is the same as in the case of general Formula I, with an acylating agent of acid halides or acid anhydrides of carboxylic acids represented by the general formula,

R—COOH      (III)

wherein R is the same as in the case of general Formula I. A full understanding on the present invention can be given with reference to the following detailed illustrations.

The compounds represented by the general Formula II which are employed as starting materials in carrying out the present invention can be easily obtained by, for example, condensing quinizarin with aminophenols in alcohol solvents in the presence of boric acid, zinc and hydrochloric acid. Examples of such compounds are as follows, which are, of course, not to limit the present invention.

1-hydroxy-4-(4'-hydroxyphenylamino)-anthraquinone,
1-hydroxy-4-(3'-hydroxyphenylamino)-anthraquinone,
1-hydroxy-4-(2'-hydroxyphenylamino)-anthraquinone,
1-hydroxy-4-(3'-hydroxy-4'-methylphenylamino)-anthraquinone,
1-hydroxy-4-(3'-hydroxy-6'-methylphenylamino)-anthraquinone,
1-hydroxy-4-(4'-hydroxy-5'-chlorophenylamino)-anthraquinone,
1-hydroxy-4-(3'-hydroxy-4'-bromophenylamino)-anthraquinone.

The preferables as acylating agents represented by the Formula III are acid halides or acid anhydrides such as, for example, anhydrides, chlorides or bromides of acetic, monochloroacetic, propionic, butyric, α-methyl butyric, n-caproic, δ-methyl caproic, acrylic, β-ethyl acrylic, glycolic, methoxyacetic, ethoxyacetic, hydroxypropionic, phenoxyacetic, crotonic, cinnamic, β-phenylpropionic, anisic, benzoic, methylbenzoic, chlorobenzoic, phenylacetic and cyclohexyl carboxylic acids. The acylation reaction of the above-mentioned hydroxy compounds with these acylating agents can be advantageously effected by stirring the mixture of them for a sufficient period of time at a temperature of 0° to 100° C. in neutral solvents such as a lower aliphatic ketone, i.e. acetone, methyl ethyl ketone or methyl isobutyl ketone, a lower aliphatic alcohol, i.e. methyl alcohol, ethyl alcohol or butyl alcohol, dimethyl formamide and dimethylsulfoxide, in the presence of acid binding agents such as sodium hydroxide, sodium carbonate, sodium bicarbonate, potassium carbonate, pyridine, triethylamine and quinoline, or in basic solvents such as pyridine. In this reaction, the acylating agent may be advantageously employed in more or less excess amount of the theoretical one based on the amount of the starting material. In case the resulting product is deposited as crystals, it is readily recovered by filtration, and in case it is difficultly deposited, water or an inert solvent to the product is added to the reaction mixture or the reaction mixture is charged in the water or the inert solvent, thereby to deposit crystals, which are recovered by filtration, followed by washing and drying. Thus, the objective product can be obtained.

One of the novel dyes obtained in accordance with the present invention or a mixture of two or more present dyes involving the unreacted hydroxy compounds (II), may be employed for dyeing and printing synthetic fiber materials, particularly polyester, polyamide, polyurethane and acetyl cellulose fibers.

More concretely speaking, at least one of the present dyes, a dispersing agent and water are admixed and ground in a ball mill for a sufficient period of time, and the resulting mixture is subjected to spray drying, thereby to obtain a dyeing agent. A fiber material mentioned above may be treated in a dye bath containing the dyeing agent obtained above at a temperature of 110° to 130° C. under pressure for 60 to 90 minutes. The thus-treated fiber material is rinsed with water and dried, thereby to obtain a dyed product in clear shade with exceedingly high fastnesses, especially fastness to sublimation. While, the said fiber article may be treated with the said dyeing agent according to the carrier dyeing or the thermosol dyeing method, or may be printed with a paste containing the said dyeing agent.

Further, it is remarkable that the dyed product having excedingly high fastness to sublimation still holds its clear shade and thickness after finishing according to the high temperature treatment such as the permanent press method.

The present invention will be illustrated more concretely with reference to the following examples, which are given by way of illustration and not by way of limitation of the present invention. All parts and percent are by weight.

EXAMPLE 1

Thirty-three parts of 1 - hydroxy-4-(4'-hydroxyphenylamino)-anthraquinone, 200 parts of pyridine and 11 parts of acetic acid anhydride are stirred at 3° to 5° C. for 2 hours, whereby a reaction progresses to deposit crystals. The crystals are recovered by filtration, washed with methanol and water, and then dried, thereby to obtain a novel dye represented by the following formula:

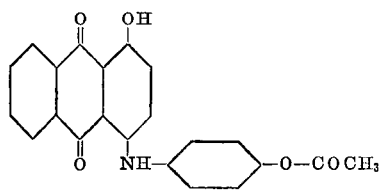

M.P. 185° to 187° C.

*Elementary analysis.*—Calculated as $C_{22}H_{15}O_5N$ (percent): N, 3.75; C, 70.8; H, 4.05. Found (percent): N, 3.76; C, 70.8; H, 4.17.

To the thus obtained dye, water and a dispersing agent are added, and the mixture is pulverized and dispersed to make a paste by means of a colloid mill. The thus obtained dyeing agent has favorable dyability on polyester fiber articles to give clear violet shade excellent in fastnesses to light, sublimation and washing.

It is remarkable that the dyed product thus-obtained has more excellent fastness to sublimation, compared with a product dyed with any known dyes, for example, 1-hydroxy-4-anilinoanthaquinone.

EXAMPLE 2

A mixture of 33 parts of 1-hydroxy-4-(3'-hydroxyphenylamino)-anthraquinone, 165 parts of acetone, 15 parts of acetic acid anhydride and 21 parts of anhydrous sodium carbonate is stirred for 1 hour at 50 to 55° C. and thereafter cooled, thereby to precipitate crystals, which are separated by filtration, washed and dried.

Thus, a novel dye having the following formula,

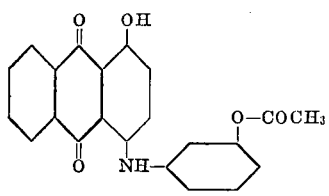

M.P. 180° to 182° C. is obtained in 95% yields. The thus obtained dye may be employed for dyeing polyester fibers in clear violet shade with high fastnesses, especially fastness to sublimation.

EXAMPLE 3

Five parts of 1-hydroxy-4-(3'-hydroxyphenylamino)-anthraquinone, 30 parts of pyridine and 7.6 parts of benzoic acid anhydride are stirred at 25°–30° C. for 6 hours, whereby a reaction progresses to deposit crystals. The crystals are isolated in the same manner as in Example 1, thereby to obtain a novel dye represented by the following formula:

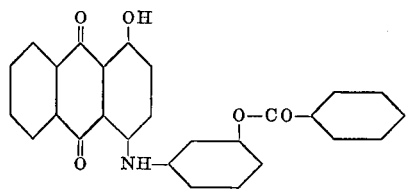

M.P. 170° to 173° C.

The thus obtained dye may be employed for dyeing polyester fibers in clear violet shade with high fastnesses, especially more excellent fastness to sublimation than that of a product dyed with any other known dyes.

The same results can be obtained when, in this example, benzoyl chloride is used in place of the benzoic acid anhydride.

EXAMPLE 4

Forty parts of benzoyl chloride is gradually added at 2° to 6° C. to a mixture comprising 33 parts of 1-hydroxy-4-(4'-hydroxyphenylamino)-anthraquinone and 330 parts of pyridine. The resulting mixture is stirred at said temperature for 3 hours, thereby to precipitate crystals. The crystals are isolated in the same manner as in Example 1 to obtain a novel dye composed mainly of a compound represented by the following formula:

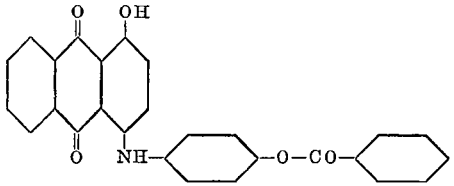

M.P. 160° to 165° C.

This dye may be employed for dyeing polyester fibers in clear violet shade with excellent fastnesses, particularly fastness to sublimation.

EXAMPLE 5

When Example 1 is repeated using 20 parts of propionic acid anhydride in place of 15 parts of acetic acid anhydride, there is obtained a novel dye represented by the following formula:

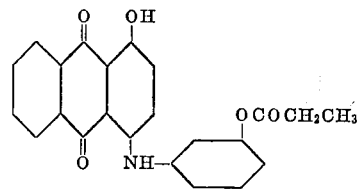

M.P. 142° to 145° C.

This dye may be employed for dyeing polyester fibers in clear violet shade with excellent fastness to sublimation.

The hydroxy compounds shown in the column I of the following table are treated with various acylating agents shown in the column II according to the same manner as in Examples 1 to 5, thereby to obtain the novel dyes shown in the column III. All of these dyes may be employed for dyeing synthetic fibers in clear shade with excellent fastnesses to light, washing and especially fastness to sublimation.

| Example Number | Hydroxy compound | Acylating agent | Dye structure | Shade on polyester fibers |
|---|---|---|---|---|
| 6 | (1-amino-4-hydroxyanthraquinone with p-hydroxyphenylamino group) | Acrylic acid anhydride | (acylated structure with OCOCH=CH₂) | Clear violet. |
| 7 | (same base structure) | n-Butyric acid anhydride | (acylated structure with OCOCH₂CH₂CH₃) | Do. |
| 8 | (same base structure) | Cyclohexanecarboxylic acid anhydride | (acylated with OCO-cyclohexyl) | Do. |
| 9 | Same as above | p-Toluyl chloride | (acylated with OCO-C₆H₄-CH₃) | Do. |
| 10 | (same base structure) | Phenylacetyl chloride | (acylated with OCOCH₂-phenyl) | Do. |

| Example Number | Hydroxy compound | Acylating agent | Dye structure | Shade on polyester fibers |
|---|---|---|---|---|
| 11 | anthraquinone-OH/NH-phenyl(OH)(CH₃) | Acetic acid anhydride | anthraquinone-OH/NH-phenyl(OCOCH₃)(CH₃) | Clear violet |
| 12 | anthraquinone-OH/NH-phenyl(Cl)(OH) | ...do... | anthraquinone-OH/NH-phenyl(Cl)(OCOCH₃) | Do. |
| 13 | anthraquinone-OH/NH-phenyl(OH)(Br) | ...do... | anthraquinone-OH/NH-phenyl(OCOCH₃)(Br) | Do. |
| 14 | anthraquinone-OH/NH-phenyl(OH)(CH₃) | Benzoic acid anhydride | anthraquinone-OH/NH-phenyl(OCO-phenyl)(CH₃) | Do. |
| 15 | anthraquinone-OH/NH-phenyl-OH | Methoxyacetyl chloride | anthraquinone-OH/NH-phenyl-OCOCH₂OCH₃ | Do. |
| 16 | Same as above | Cinnamoyl chloride | anthraquinone-OH/NH-phenyl-OCOCH=CH-phenyl | Do. |

| Example Number | Hydroxy compound | Acylating agent | Dye structure | Shade on polyester fibers |
|---|---|---|---|---|
| 17 | [1,4-dihydroxy-anthraquinone with NH-phenyl-OH structure] | p-Anisoyl chloride | [anthraquinone with OH and NH-C6H4-OCO-C6H4-OCH3] | Clear violet |
| 18 | Same as above | Chloroacetyl chloride | [anthraquinone with OH and NH-C6H4-OCOCH2Cl] | Do. |
| 19 | do | Phenoxyacetyl chloride | [anthraquinone with OH and NH-C6H4-OCOCH2O-C6H5] | Do. |
| 20 | do | p-Chlorobenzoic acid anhydride | [anthraquinone with OH and NH-C6H4-OCO-C6H4-Cl] | Do. |
| 21 | do | Hydroxypropionyl chloride | [anthraquinone with OH and NH-C6H4-OCOCH2CH2OH] | Do. |

What we claim is:
1. A novel dye represented by the following formula,

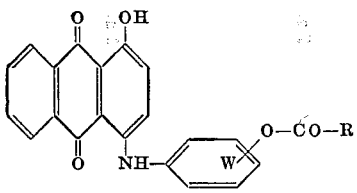

wherein R is a saturated or unsaturated aliphatic hydrocarbon group having 1 to 6 carbon atoms; a saturated or unsaturated aliphatic hydrocarbon group having 1 to 6 carbon atoms substituted by methoxy, ethoxy, hydroxy, phenoxy or phenyl group or a halogen atom; phenyl group; a phenyl group substituted by a lower alkyl, and alkoxy having 1 to 2 carbon atoms or a halogen atom; or cyclohexyl group; and the nucleus W may further be substituted with methyl group or a halogen atom.

2. A dye having the following formula,

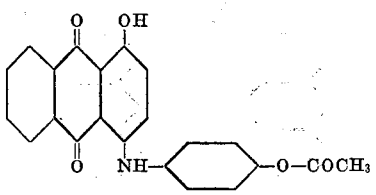

3. A dye having the following formula,

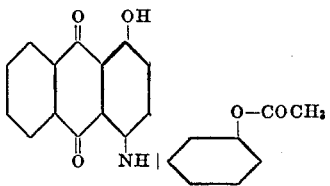

4. A dye having the following formula,

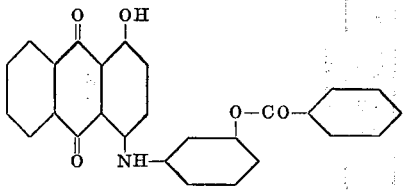

5. A dye having the following formula,

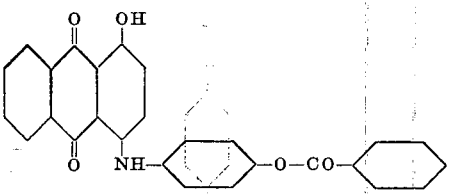

6. A dye having the following formula,

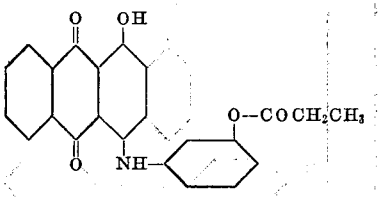

References Cited
UNITED STATES PATENTS

| | | | |
|---|---|---|---|
| 2,338,908 | 1/1944 | Dickey et al. | 260—376 |
| 2,333,384 | 11/1943 | Klein | 260—376 |
| 2,766,262 | 10/1956 | Belshaw | 260—376 |
| 3,097,909 | 7/1963 | Rhyner et al. | 260—376X |

OTHER REFERENCES

Wagner et al.: Synthetic Organic Chemistry, pp. 480–483 (1953).

LEWIS GOTTS, Primary Examiner

E. J. SKELLY, Assistant Examiner

U.S. Cl. X.R.

8—39, 40